United States Patent
Burri et al.

(10) Patent No.: US 12,467,807 B2
(45) Date of Patent: Nov. 11, 2025

(54) DEVICE FOR TESTING A CONNECTION OF A GUARANTEE STRIP OF A SECURITY SEAL OF A CLOSURE LID HAVING A LID MAIN BODY

(71) Applicant: PACKSYS GLOBAL AG, Burgdorf (CH)

(72) Inventors: Gregor Burri, Hinwil (CH); Martin Hürlimann, Röthenbach (CH)

(73) Assignee: PACKSYS GLOBAL AG, Burgdorf (CH)

( * ) Notice: Subject to any disclaimer, the term of this patent is extended or adjusted under 35 U.S.C. 154(b) by 1277 days.

(21) Appl. No.: 17/276,030

(22) PCT Filed: Sep. 11, 2019

(86) PCT No.: PCT/EP2019/074244
§ 371 (c)(1),
(2) Date: Mar. 12, 2021

(87) PCT Pub. No.: WO2020/053286
PCT Pub. Date: Mar. 19, 2020

(65) Prior Publication Data
US 2022/0034736 A1 Feb. 3, 2022

(30) Foreign Application Priority Data
Sep. 14, 2018 (EP) .................................. 18194577

(51) Int. Cl.
*G01L 5/00* (2006.01)
*B65B 57/04* (2006.01)
*B65B 69/00* (2006.01)

(52) U.S. Cl.
CPC .............. *G01L 5/009* (2013.01); *B65B 57/04* (2013.01); *B65B 69/0033* (2013.01); *G01L 5/0071* (2013.01)

(58) Field of Classification Search
CPC .... G01L 5/0071; G01L 5/009; G01M 99/007; B65B 57/04; B65B 69/0033
See application file for complete search history.

(56) References Cited

U.S. PATENT DOCUMENTS

| | | | | |
|---|---|---|---|---|
| 4,716,772 A | * | 1/1988 | Bubeck | G01L 5/0042 73/862.041 |
| 4,794,801 A | * | 1/1989 | Andrews | G01L 5/0042 73/847 |

(Continued)

FOREIGN PATENT DOCUMENTS

| | | | | |
|---|---|---|---|---|
| CN | 101932512 A | * | 12/2010 | B65D 41/045 |
| JP | S5593034 A | * | 7/1980 | |

(Continued)

OTHER PUBLICATIONS

Anonymous, "Closure force; Mecmesin Closure Testing," Retrieved from the Internet: https://web.archive.org/web/20170327024648/https://www.closuretesting.com/methods/closure-force, XP055562728, Mar. 27, 2017, pp. 1-5.

*Primary Examiner* — Natalie Huls
(74) *Attorney, Agent, or Firm* — Birch, Stewart, Kolasch & Birch, LLP

(57) ABSTRACT

A device for testing a connection of a guarantee strip of a security seal of a closure lid having a lid main body, which device comprises a driver element for gripping the guarantee strip and a stop element for the lid main body. The driver element and the stop element are movable relative to each other such that a tear-off force can be exerted on the guarantee strip. The device also comprises a force-measuring device, for measuring the tear-off force during the relative movement of the guarantee strip and the lid main body, and a separating device for severing the guarantee strip after it has been torn off from the lid main body. The device can be operated in a fully automatic manner and can (Continued)

be integrated in a system for producing closure lids having guarantee strips.

15 Claims, 7 Drawing Sheets

(56) References Cited

U.S. PATENT DOCUMENTS

| | | | |
|---|---|---|---|
| 8,001,748 B2* | 8/2011 | Schulz | B67B 3/2033 |
| | | | 53/331.5 |
| 9,417,145 B2* | 8/2016 | Cochran | G01N 21/909 |
| 12,053,898 B2* | 8/2024 | Venturini | B26F 1/18 |
| 2008/0072661 A1* | 3/2008 | Prestley | G01M 3/36 |
| | | | 73/52 |

FOREIGN PATENT DOCUMENTS

| | | | | |
|---|---|---|---|---|
| JP | S60335 | A | * | 1/1985 |
| JP | H1038527 | A | * | 2/1998 |
| JP | 2004-28957 | A | | 1/2004 |
| JP | 2004028957 | A | * | 1/2004 |
| JP | 3875929 | B2 | * | 1/2007 |
| JP | 2010237025 | A | * | 10/2010 |
| JP | 2012189536 | A | * | 10/2012 |

* cited by examiner

DEVICE FOR TESTING A CONNECTION OF A GUARANTEE STRIP OF A SECURITY SEAL OF A CLOSURE LID HAVING A LID MAIN BODY

TECHNICAL FIELD

The invention relates to a device for testing a connection of a guarantee strip of a security seal of a closure lid having a lid main body. The device comprises a take-along element for gripping the guarantee strip, a stop element for the lid main body, wherein the take-along element and the stop element are movable relative to each other in such a manner that a tear-off force can be exerted on the guarantee strip, and a force-measuring device for measuring the tear-off force during the relative movement of the guarantee strip and the lid main body. The invention furthermore relates to an installation for slitting a guarantee strip for the security seal of a closure lid with such a device for testing.

PRIOR ART

A security seal ensures that it is possible to immediately see if, after the initial filling of a container, a closure lid has been removed in the meantime and reattached. This could indicate that the container contents have been exchanged or contaminated and indicates to the user that the user should not use the container contents, i.e., for example, should not consume a food item.

Various types of security seals are known, wherein the choice of the respective type namely depends on the type of container. One type of security seals comprises a guarantee strip which is arranged on a main body of the closure lid over a line of weakness. When the closure lid is removed (for example by unscrewing), the guarantee strip interacts with a counterpart on the container in such a manner that said guarantee strip is torn off from the lid main body and/or is severed along its circumference. In both cases, it is apparent in view of the damaged guarantee strip or guarantee strip which is no longer present that the closure lid has been removed (in the meantime).

Known security seals, for example on bottle closures with lids made of plastic or metal sheet, comprise guarantee strips which are attached to the lid main body via a plurality of bridges, wherein the main body, the bridges and the ring are formed integrally. They furthermore comprise an encircling, bead-like projection on the container, which holds back the guarantee strip during removal of the lid.

The line of weakness can be introduced at the same time as the lid is being molded, or not until a subsequent cutting procedure, for example by introducing suitable slits. In both cases, it should be ensured that the guarantee strips meet the requirements set (for example in respect of a force required for tearing off or tearing open). For this purpose, lids are randomly removed from the production process and tested. The testing has hitherto taken place generally manually or with manually operated, specially equipped stress-and-strain measuring devices, wherein the tear-off force has been measured with the aid of a force sensor and the force required for tearing off (or tearing open) has been determined. If said force lies outside a predetermined range (which is dependent, inter alia, on the type of container and the material and also the geometry of the lid), there is a fault in the production process, which should be eliminated, for example by adapting operating parameters and/or by exchanging tools.

The hitherto manual inspection has been time-consuming also because the torn-off guarantee strips have frequently been slid onto a stop piece for the lid main body and have had to be manually removed by the user at the latest following a few measurements. Further delays have also arisen because the samples to be tested have first of all had to be transported from the manufacturing line to a laboratory. The delayed preparation of the measurement result has meant that high reject rates have occurred when faults have been discovered.

SUMMARY OF THE INVENTION

It is the object of the invention to provide a device belonging to the technical field mentioned at the beginning for testing a connection of a guarantee strip of a security seal of a closure lid having a lid main body, said device permitting rapid testing.

The object is achieved by the features of claim 1. According to the invention, the device comprises a cutting device for severing the guarantee strip after the latter has been torn off from the lid main body.

The take-along element can be a bead-like structure which substantially corresponds to the structure on the container with which the closure lid is intended to interact. However, the take-along element can also be formed by a plurality of spaced-apart structures, for example cams. In both cases, the closure lid with attached guarantee strip and the take-along element are positioned relative to each other prior to the measurement of the tear-off force in such a manner that the guarantee strip engages behind the take-along element at least in regions. For this purpose, in particular in the case of a take-along element with a fixed shape, the closure lid with the guarantee strip can be pushed over the take-along element or the take-along element can be pushed into the closure lid. Take-along elements with a variable shape, for example with radially movable claws, can be introduced into the lid interior and are only then expanded. Furthermore, gripping elements, for example with tong-like clamping mechanisms, which grasp the guarantee strip in an encircling manner or at spaced-apart points, can also be used.

The stop element interacts in particular with a base of the lid main body (i.e. with the inside of the lid). Embodiments are also possible in which the stop element interacts with an element on the inside of the lid, for example a sealing lip, or with the outside of the lid and, for example, comprises a vacuum bell jar.

Tear-off force here is understood as meaning a force which engages on the guarantee strip in such a way and acts in such a direction that, at a sufficient value (the "force required for tearing off"), the guarantee strip is torn off from the lid main body and/or is torn open along its circumference.

The measurement of the tear-off force preferably comprises incorporating a force-time or force-displacement profile at least until the guarantee strip has been torn off. Alternatively, however, only a maximum tear-off force is measured and stored or transmitted; this substantially corresponds to the above-mentioned force required for tearing off.

The severing of the guarantee strip leads to a considerable simplification in the removal of the guarantee strip from the testing device, in particular when the testing device is designed in such a manner that the torn-off guarantee strips are slid onto an element. The severing then permits transport away which does not necessarily have to take place axially along the element.

The severing is not only expedient when the guarantee strip is torn off as a whole from the lid main body, but also when said guarantee strip is severed along the circumference during the opening operation. If a plurality of sections are formed by the severing, in contrast to sections which describe an angle of more than 180°, said "substantially linear" parts are readily detached from other elements.

In a preferred embodiment, the stop element is formed on the end side of a mandrel, and the take-along element surrounds the mandrel in a sleeve-shaped manner and is movable linearly relative to the mandrel along a longitudinal direction of the mandrel. The mandrel has in particular the geometry of a rectilinear circular cylinder, wherein the diameter is somewhat smaller than the inside diameter of the closure lid. The end-side surface of the mandrel is designed in such a manner that it can interact with the lid main body. The base or another part of the lid main body interacts on the inside of the lid with the end-side surface and defines the axial position of the lid main body. By means of a relative movement between mandrel and take-along element, during which the take-along element is moved away from the end side of the mandrel, a tear-off force is exerted on the guarantee strip. The coaxial arrangement of mandrel and sleeve-shaped take-along element permits a stable and simple mounting of the take-along element and a defined further movement of the detached guarantee strip by the latter being guided further by the mandrel and initially remaining strung on the latter.

Since the guarantee strip is subsequently slit open, it can be removed directly from the mandrel. Therefore, in principle, an unlimited number of measurements can be carried out. This is in contrast to the case in which initially a plurality of guarantee rings remain strung on the mandrel.

The cutting device preferably comprises at least one slitting knife which is arranged in the circumferential region of the mandrel and is designed in such a manner that the guarantee strip is cut as it moves over the slitting knife, along the longitudinal direction of the mandrel. During the slitting operation, the guarantee strip is mounted on the sleeve-shaped take-along element such that reliable cutting takes place during a corresponding infeed of the slitting knife. The slitting knife can be arranged fixedly relative to the mandrel, and the required relative movement arises from the axial movement of the sleeve-shaped take-along element relative to the mandrel (and therefore to the slitting knife).

Alternatively, movable slitting knives or slitting disks or other types of cutting tools, for example heated blades or laser tools, are used.

The cutting device preferably comprises at least two slitting knives which are arranged in such a manner that the guarantee strip is severed at two circumferentially spaced-apart points. For example, two slitting knives which are arranged opposite one another (i.e. enclose an angle of) 180° can be provided. It is also possible to use three or more slitting knives which are preferably arranged uniformly along the circumference.

Two or more parts of the guarantee strip that arise by means of the severing can be transported away significantly more simply and reliably than a single (severed) strip. Upon severing into a plurality of parts, said parts, for example, can also be sucked off in a simple manner.

The sleeve-shaped take-along element advantageously has at least one groove in the longitudinal direction of the mandrel, said groove interacting with the at least one slitting knife. The groove on the outside of the take-along element readily enables passage of the slitting knife without the take-along element or the slitting knife having to have movable parts. By contrast to a multi-part take-along element, the parts of which are in each case arranged between the slitting knives, a simpler design with improved stability arises.

The longitudinal direction of the mandrel advantageously has an angle of at least 30° with respect to a horizontal plane, wherein a movement in the longitudinal direction of the mandrel for measuring the tear-off force takes place upward and wherein the device comprises a collecting apparatus for the lid main body and the torn-off guarantee strip, said collecting apparatus being movable below the mandrel temporarily into a collecting position. If the longitudinal direction of the mandrel has a substantial vertical component, the lid main body and the guarantee strip can be conveyed away from the mandrel with the aid of gravity. Additional conveying means in the immediate vicinity of the mandrel (such as sucking-off devices or magnets for processing closure lids made of ferromagnetic materials) are superfluous. The collecting apparatus ensures that the main bodies and strips falling downward from the mandrel are reliably collected for transporting away. The fact that said collecting apparatus is moved only temporarily into the collecting position means that the unobstructed loading of the mandrel with the next closure lid is made possible.

The collecting apparatus advantageously has a collecting surface which is inclined in the collecting position, and therefore the collected lid main body and the collected guarantee strip are automatically conveyed further owing to gravity. As a result, separate conveying means which interact with the collecting apparatus can be avoided.

In a preferred embodiment, the longitudinal direction of the mandrel has an inclination of 10-80° with respect to the horizontal plane, and the supporting surface of the collecting apparatus in the collecting position is perpendicular to the longitudinal direction of the mandrel. The oblique arrangement of the mandrel and of the supporting surface of the collecting apparatus permits a particularly simple construction in which in particular a unit which comprises the mandrel and the mounting of the supporting surface can be installed at an inclination with respect to a horizontal. The oblique arrangement also makes it possible for the feed direction for the closure lids in the longitudinal direction of the mandrel and the outfeed direction, which is directed vertically downward owing to gravity, for the main bodies and guarantee strips to differ. Possible conflicts between the feeder and the outfeed can thus already be minimized in terms of design.

Particularly preferably, an entire assembly of the device with feeder, mandrel and outfeed is arranged obliquely overall. In particular, a device can thus be constructed which comprises the sleeve-shaped take-along element and the collecting apparatus as sole movable elements, and the remaining movements of the closure lid to be tested and of the main bodies and guarantee strips to be disposed of are brought about by gravity.

Alternatively, a vertical or approximately vertical arrangement of the mandrel is also possible: with a correspondingly movable collecting apparatus, the material which is to be removed can be conveyed away out of the feed path for the closure lids, and, by means of a severing of the guarantee strip into a sufficient number of parts (for example at least 2 or 3 parts), it can be ensured that the strip does not remain on the mandrel, but rather drops onto the collecting apparatus owing to gravity. A horizontal arrangement of the mandrel or an inclined arrangement with an angle of below 10° is also possible. In this case, it can be expedient to provide a separate orientation for releasing the lid main body from the mandrel, for example an ejection mechanism mounted in the mandrel. In this case, it can also be of advantage if the guarantee strip is severed at a plurality of points such that all of the parts are reliably detached from the mandrel.

The invention is not restricted to embodiments with a mandrel for the clamping of the closure lid. Instead of a mandrel, other stop elements are possible, for example grippers, which grip the lid main body from the outside and comprise mechanical and/or pneumatic holding apparatuses. The take-along element can also be designed differently— with a mandrel-like or other stop element—and can be guided, for example, on a separate linear guide.

The collecting apparatus is preferably movable into the collecting position by rotation about an axis parallel to the longitudinal direction of the mandrel. This results in a rapid and simple movement. The corresponding pivoting in can take place very rapidly. If the collecting apparatus, as described above, has an inclined collecting surface, the collected parts owing to gravity slide away from the collecting surface, for example into an opening located below the latter and opening up the path into a collecting container. During the pivoting back, the parts are thus no longer located on the collecting surface, and therefore this renewed pivoting movement (of the empty collecting apparatus) can also take place at high speed.

The collecting apparatus can also be brought into the collecting position in a different manner, for example by means of a pivoting movement about an axis which is at an angle to the longitudinal direction of the mandrel, or by a linear movement.

The device advantageously comprises an evaluation unit for receiving measurement values of the measurements of the tear-off force, for determining with reference to said measurement values whether the connection of the guarantee strip to the lid main body meets predetermined properties and for outputting results of this determination. The outputting can take place via an integrated output device. The result can thus be visually displayed on a screen and/or acoustically output via a speaker. The outputting can also take place via an interface which is connectable to an output device, to a device for further processing and/or storing the information or to a machine controller.

In the simplest case, that value of the tear-off force which has led to the tearing off or severing of the guarantee strip is determined and output or transmitted. This is generally the maximum force value which has been measured during a testing operation. (In the case of certain geometries of the guarantee strip and the connection thereof to the main body, the maximum force can already occur before the actual tearing off or severing. However, even in these cases, the maximum force is a suitable measure for assessing the correct formation of the connection between guarantee strip and main body.)

However, it can preferably now also be determined by the evaluation unit with reference to a plurality of received measurement values for the same connection whether one of a plurality of bridges of the connection has a considerably reduced or increased tear-off force in comparison to other bridges of the connection. For this purpose, a plurality of force values are determined and analyzed. The premature or delayed tearing off of a bridge is generally expressed by a plurality of (local) force maxima. If such force maxima are present and they have a certain minimum spacing in the force-displacement or force-time profile, it can be concluded that tearing off is not according to the standard and therefore there is a possible production fault. The plurality of received measurement values can be pre-processed prior to the analysis, for example averaging can take place, a standard deviation or differentiation can be calculated, or other statistical calculations can be undertaken.

The device preferably comprises
 d) a feed apparatus for automatically feeding the closure lid to the take-along element and to the stop element; and
 e) an outfeed apparatus for automatically removing the lid main body and the torn-off guarantee strip from the take-along element and/or the stop element.

The device can therefore be used fully automatically and namely coupled directly to an installation for producing closure lids with guarantee strips. For example, following that station in which the guarantee strips are produced or manufactured, closure lids are periodically rejected (for example with the aid of a blowing unit) and guided to the feed apparatus of the device. For example, a test can thus be undertaken every minute or every 30 s (or even more frequently). In principle, with a correspondingly designed and operated device according to the invention, up to 10 closure lids per minute (or even more) can be checked. Conventional manual inspections frequently were undertaken only every half hour or even only every hour. At a production rate of up to 3,500 lids per minute, the possible rejects in the worst case have therefore been up to 210,000 closure lids.

If the test indicates problems, corresponding measures can immediately be undertaken at the installation. The rejects are therefore minimized. (If the guarantee strips are formed separately from the molding process of the closure lids, when a fault is found, for example, in a continuously operating installation, the station for producing the guarantee strips can be immediately switched off, with the closure lids being transported initially being conveyed into a collecting container. Depending on the time required for the necessary maintenance or repair measures, the parts of the installation that are arranged upstream can continue to operate or can be halted in a controlled manner. The closure lids not yet provided with the guarantee strip are then fed to the corresponding station at a later time.)

An installation according to the invention for slitting a guarantee strip for the security seal of a closure lid comprises
 a slitting apparatus for producing circumferential cuts in order to form the guarantee strip on a lid main body of the closure lid; and
 a testing device, which is arranged downstream of the slitting apparatus, with an automatic feed apparatus and an automatic outfeed apparatus for testing a connection of the guarantee strip to the lid main body,
wherein the closure lid is automatically fed by the slitting apparatus to the device for testing.

In such an installation, the evaluation unit is advantageously coupled in terms of signals to a control apparatus of the installation such that the results of the determination can be transmitted to the control apparatus. The testing device can thus be completely integrated in the installation. The output or processing devices of the installation that are present can be used, and measures in the installation can be automatically triggered.

In a preferred embodiment of the installation according to the invention, the control apparatus is designed in such a manner that a processing parameter of the slitting apparatus, in particular a temperature of a slitting knife of the slitting apparatus, can be influenced according to the transmitted results.

It has been shown that, during the operation of such a slitting apparatus for closure lids made from plastic, the sharpness of the slitting knife, which changes due to the wear during the operation, and the temperature of the slitting knife, which can be influenced with the aid of a controllable heater, are the critical variables for the working result. This is because a loss of sharpness of the slitting knife can be compensated for to a certain degree by an increased temperature. If slits are produced which are less deep or are incomplete due to a loss in sharpness, this leads to an increased tear-off force that is necessary for detaching or severing the guarantee strip. This can be determined by the testing device and transmitted to the control apparatus of the installation. Said control apparatus can then adjust the heating of the slitting knife upward in order to increase the temperature of the slitting knife until satisfactory values of the tear-off force result again.

If the slitting knife is already heated to a predetermined maximum temperature, when closure lids which are not according to the standard are determined, a change of knife or a regrinding operation for the knife can be triggered. These measures can be carried out automatically in the slitting apparatus or manually.

Alternatively or additionally to the temperature, an infeed of the slitting knife can also be controlled according to the transmitted results.

It can be of advantage if a tested closure lid is assigned to a part-tool of the slitting apparatus, which part-tool has interacted with the closure lid during the slitting of the guarantee strip, and/or to a cavity of an injection mold such that malfunctions determined with reference to the measurements of the tear-off force can be assigned to said part-tool and/or to the cavity. In the case of known slitting apparatuses, slitting knives with a curved cutting edge are arranged in a stationary manner circumferentially, and the closure lids to be processed are guided along said slitting knives by a plurality of rotatable clamping mandrels arranged on a turntable. In this case, the assignment mentioned makes it possible to determine whether there is a malfunction at one of said clamping mandrels. Similarly, a non-conforming tear-off force that is required can indicate that there is a problem with the cavity of an injection mold used for producing the closure lid. The assignment to the cavity takes place in particular by, before the testing of the guarantee strip, the relevant closure lid being visually detected by means of a camera in such a manner that an identification of the cavity that is engraved in the lid can be read and transmitted to the testing device or directly to a master controller.

The device according to the invention for testing can be used not only in conjunction with slitting apparatuses, but also with other apparatuses for producing guarantee strips, for example stamping apparatuses or injection molding machines.

Further advantageous embodiments and combinations of features of the invention emerge from the detailed description below and the entirety of the patent claims.

BRIEF DESCRIPTION OF THE DRAWINGS

In the drawings used for explaining the exemplary embodiment.

In principle, identical parts are provided with the same reference signs in the figures.

Ways for Implementing the Invention

Figure 1:
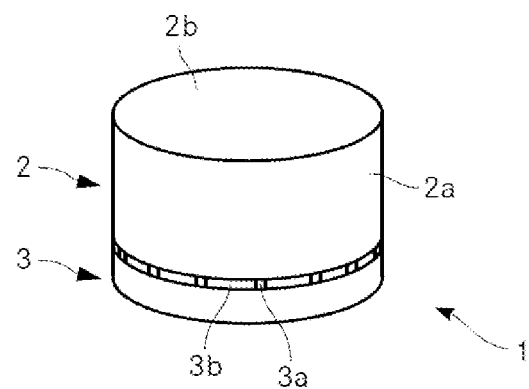
FIG. 1 shows a schematic depiction of a closure lid with a guarantee strip.

FIG. 1 shows a schematic depiction of a closure lid with a guarantee strip. The closure lid 1 comprises a lid main body 2, which is formed from a circular-cylindrical casing 2a and a base 2b, and a guarantee strip 3 with a strip-shaped part which is connected to the casing 2a of the lid main body 2 via a plurality of bridges 3a. The strip-shaped part is inwardly thickened, thus resulting in an undercut behind the strip-shaped part in the direction of the base 2b. In connection with the described exemplary embodiment, it is assumed that the closure lid 1 is produced from plastic (in particular polyethylene PE or polypropylene PP) and, in a manner known per se, has an internal thread for screwing onto a bottle, in particular a beverage bottle made from PET or glass. The closure lid 1 is manufactured by injection molding, the guarantee strip 3 is produced subsequently by slits 3b being introduced between the remaining bridges 3a by means of a slitting apparatus, and by a lower section of the strip-shaped part being folded up inward, thus resulting in the thickening.

The invention can also be used with different types of lids, for example with those made from metal sheet or with those in which the guarantee strip is already formed during the injection molding without an additional slitting process.

Figure 2:
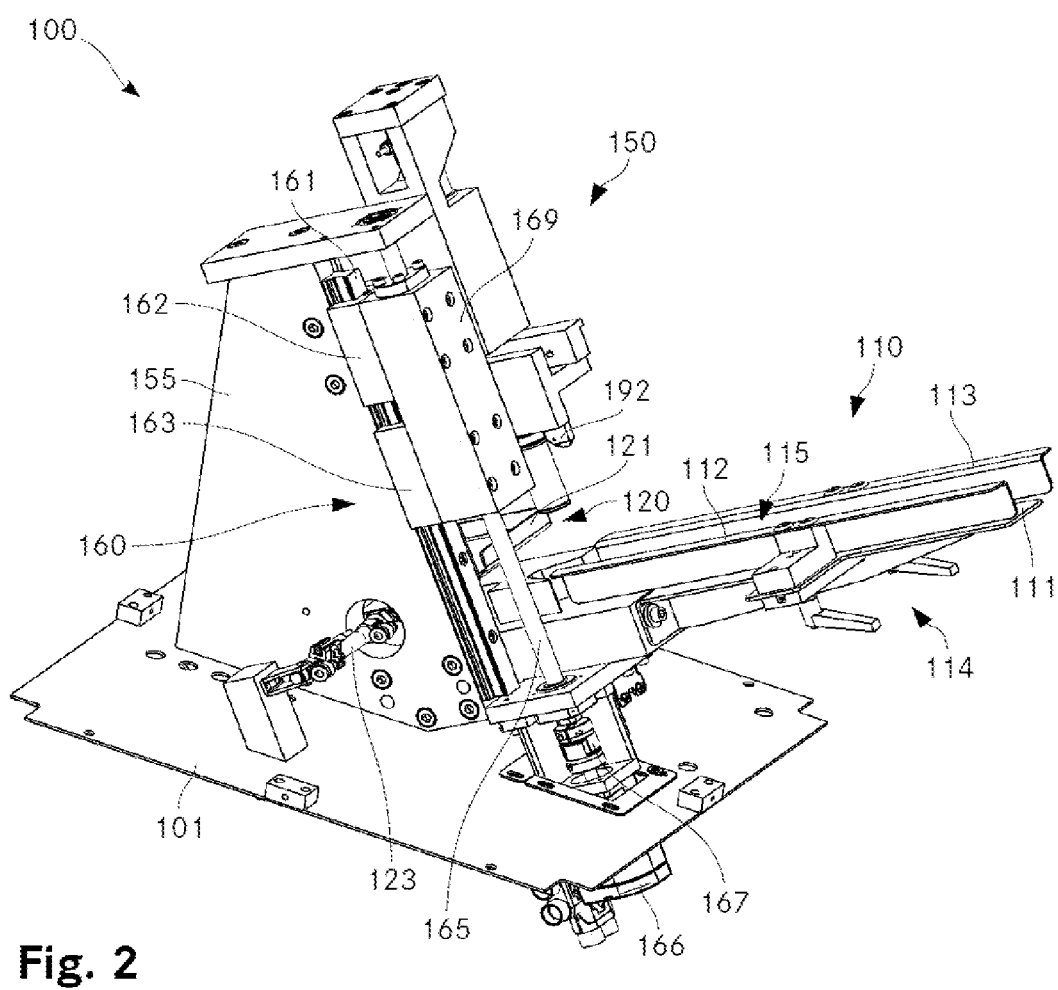
FIG. 2 shows a first oblique view of a device according to the invention for testing the connection of the guarantee strip to the lid main body.
Figure 3:
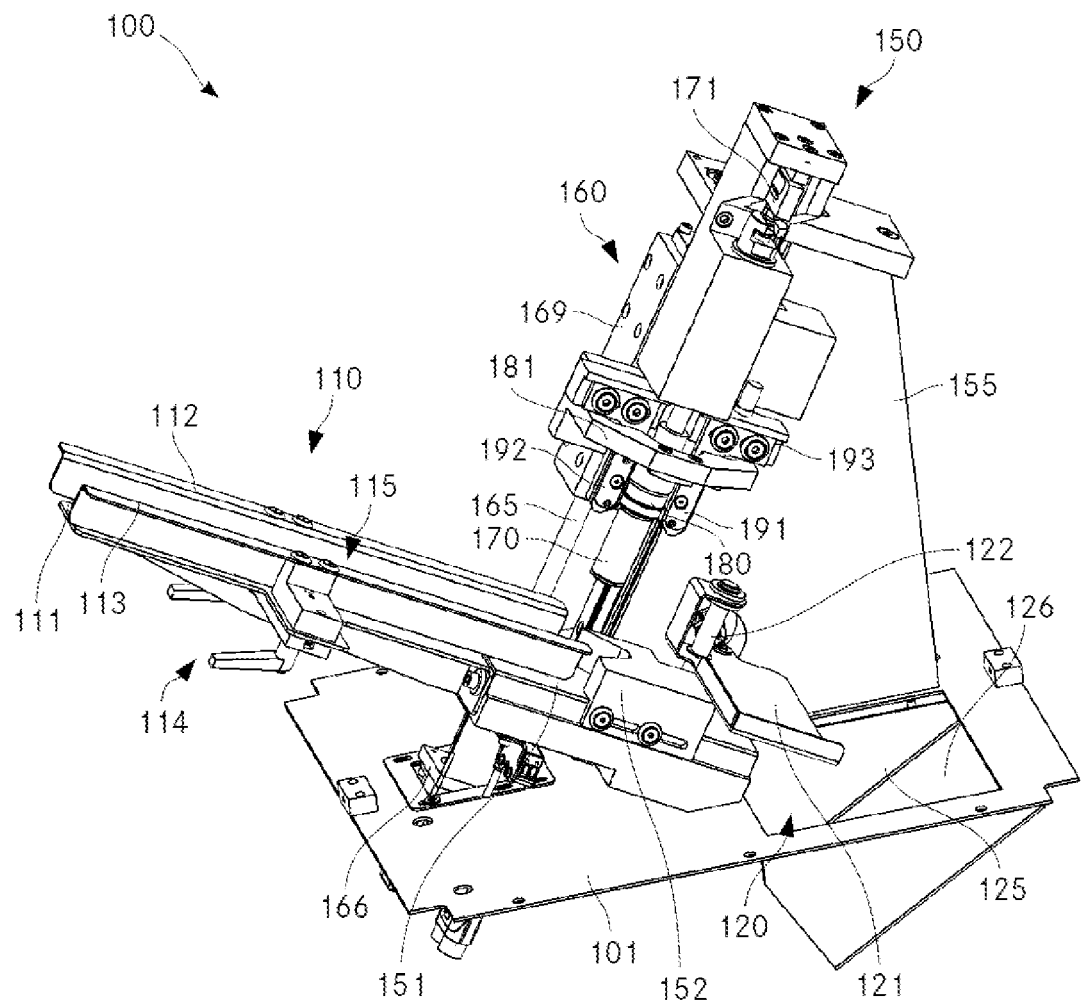
FIG. 3 shows a second oblique view of the device.

FIG. 2 shows a first oblique view of a device according to the invention for testing the connection of the guarantee strip to the lid main body, and FIG. 3 shows a second oblique view from the opposite side.

The testing device 100 comprises a base plate 101 on which a feeder 110, an outfeed 120 and a testing unit 150 in between are arranged. The feeder 110 comprises a base part 111 which is arranged obliquely with respect to the baseplate 101 of the testing device 100 and has a flat upper surface. The feeder 110 furthermore comprises two side parts 112, 113, the mutual distance between which can be changed by means of an adjustment device 114. Together with the base part 111, the two side parts 112, 113 form a guide channel 115 for the closure lids, in which guide channel said closure lids are conveyed toward the testing unit 150 owing to gravity. The channel can be adapted to different lid sizes by adjustment of the lateral position of the side parts 112, 113.

The outfeed 120 comprises a table 121 which is mounted rotatably at an axis 122. The axis 122 is perpendicular to the table plane and also to the plane of the base part 111 of the feeder 110. The table 121 has an eccentric projection to which the end of a piston rod of a pneumatic cylinder 123 is connected via a pivotable bearing. By actuation of the pneumatic cylinder, the table 121 can be pivoted about the axis 122. The outfeed 120 furthermore comprises an opening 125 in the base plate 101 of the device 100, and an inclined outfeed plate 126 which adjoins the opening 125.

The testing unit 150 comprises a bottom plate 151 on which a stop part 152 is mounted in a linearly displaceable manner. The bottom plate 151 of the testing unit 150 is oriented obliquely, parallel to the upper surface of the base part 111 of the feeder 110. In addition, the two parts are arranged relative to each other in such a manner that closure lids slipping downward on the base part 111 owing to gravity are conveyed onto the bottom plate 151 of the testing unit 150 and take up a predeterminable position there because of the side parts 112, 113 of the feeder 110 and the stop part 152 of the testing unit 150.

The testing unit 150 furthermore comprises a support plate 155 which is arranged on the base plate 101 of the testing device 100 and forms an oblique support surface, the plane of which runs perpendicularly to the plane defined by the bottom plate 151. A rail 161 of a linear guide 160 is fastened on the support surface of the support plate 155. A spindle 165 with the associated drive, a servomotor 166, is also mounted at its upper end on the support plate 155 and at its lower end on a bearing element connected to the base plate 101 of the testing device 100. The servomotor 166 (or alternatively a stepping motor) is arranged below the base plate 101 and is connected to the spindle 165 via a coupling 167. The longitudinal axis of the spindle 165 runs parallel to the support surface and therefore to the rail 161 of the linear guide 160.

Figure 4:
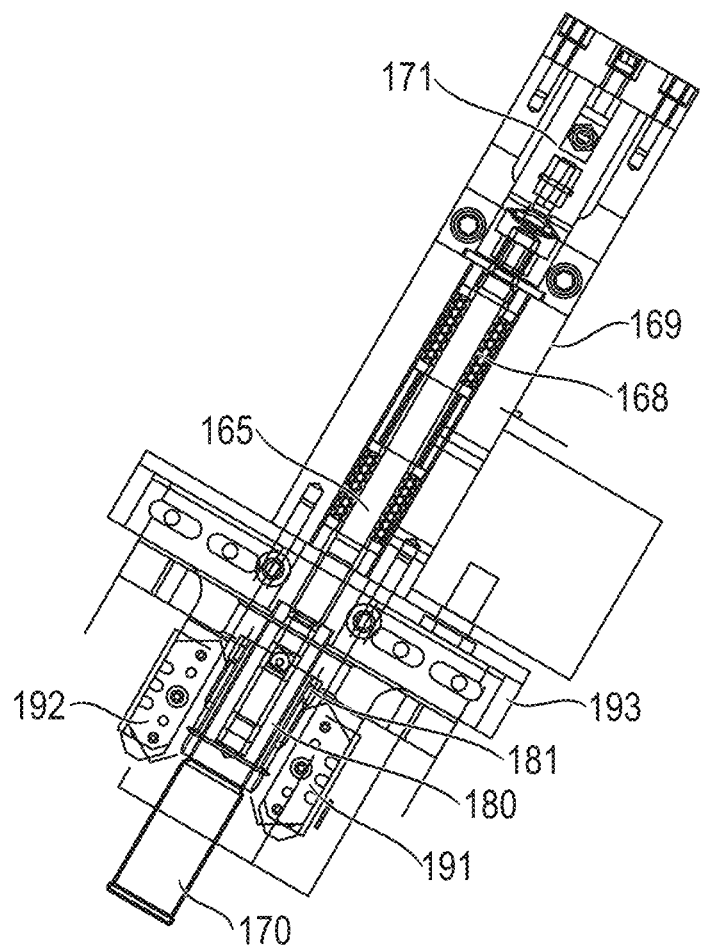
FIG. 4 shows a cross-sectional illustration of the mandrel, the take-along sleeve and the slitting knife.

The spindle 165 interacts with a ball circuit 168 (cf. FIG. 4) which is incorporated in a housing 169. The housing 169 is fixedly connected to guide elements 162, 163 which interact with the rail 161. By actuation of the spindle 165 by means of the servomotor 166, the housing 169 can be moved along the rail 161.

The testing unit 150 furthermore comprises a positionally fixed, circular-cylindrical mandrel 170 which is connected to the support plate 155 via a force-measuring unit 171. The longitudinal extent of the mandrel 170 runs parallel to the support surface, to the rail 161 and to the spindle 165. The force-measuring unit 171 measures compressive forces transmitted to the end surface of the mandrel 170.

Figure 5:
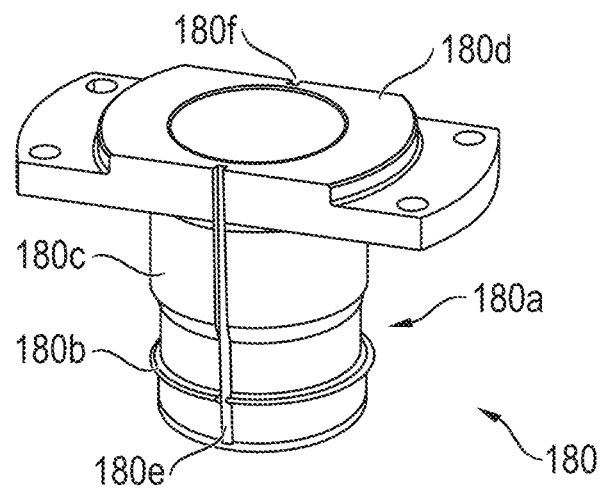
FIG. 5 shows an oblique image of the take-along sleeve.

A take-along sleeve 180 is arranged via a holder 181 on the housing 169 which is movable along the rail 161 with the aid of the linear guide 160. Said take-along sleeve is illustrated in detail in FIG. 5. The take-along sleeve 180 has a cylindrical section with a contact region 180$a$ for a closure lid, in which contact region a bead 180$b$ for gripping behind the guarantee strip is formed. The contact region 180$a$ is adjoined to the rear by a shaft region 180$c$ which merges into a fastening flange 180$d$. The take-along sleeve 180 is fastened exchangeably to the holder 181 by the fastening flange 180$d$. Furthermore, the take-along sleeve 180 has two axial grooves 180$e$, 180$f$ which are arranged running opposite each other on the outer casing, from the fastening flange 180$d$ via the shaft region 180$c$ into the contact region 180$a$.

The take-along sleeve 180 surrounds the mandrel 170 coaxially. The take-along sleeve 180 can be moved along the mandrel 170 with the aid of the linear guide 160. This situation is illustrated inter alia in the cross section according to FIG. 4.

Furthermore, two slitting knives 191, 192, the cutting edges of which extend at a predetermined distance parallel to the casing of the mandrel 170, are arranged on the support plate 155 via a holder 193. The slitting knives 191, 192, like the mandrel 170, are arranged in a stationary manner and all three elements have a fixed location reference. The slitting knives 191, 192 and the take-along sleeve 180 are arranged in such a manner that the cutting edges of the slitting knives 191, 192 are received in the grooves 180$e$, 180$f$ of the take-along sleeve 180 when the take-along sleeve 180 is moved over the region of the slitting knives 191, 192. The take-along sleeve 180 can therefore be moved from a position completely below the slitting knives 191, 192 into a position completely above the slitting knives 191, 192. If a guarantee strip is taken over by the take-along sleeve 180, by the bead 180$b$ interacting with the inwardly protruding section or the thickening of the guarantee strip, the strip is cut at two diametrically opposite points by the two slitting knives 191, 192 such that two curved sections of 180° each are formed.

Figure 6:
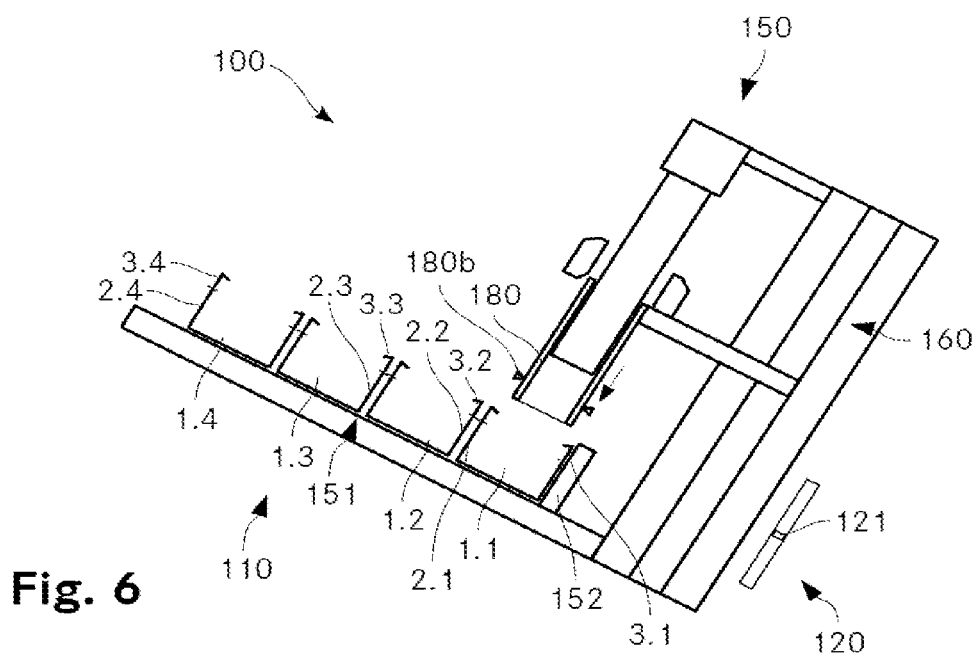
FIG. 6-10 show schematic illustrations of the device according to the invention for explaining the testing method carried out with the device.
Figure 7:
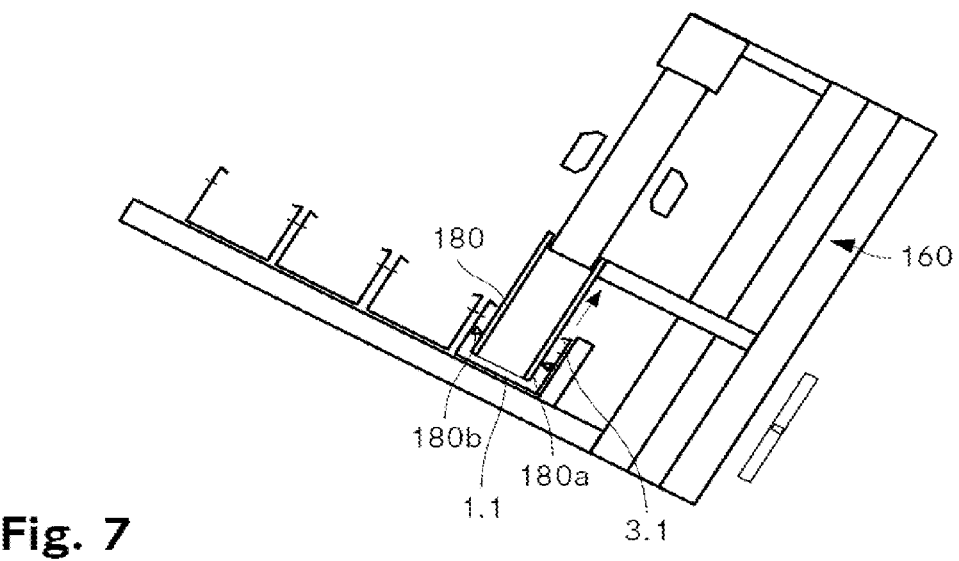
Figure 8:
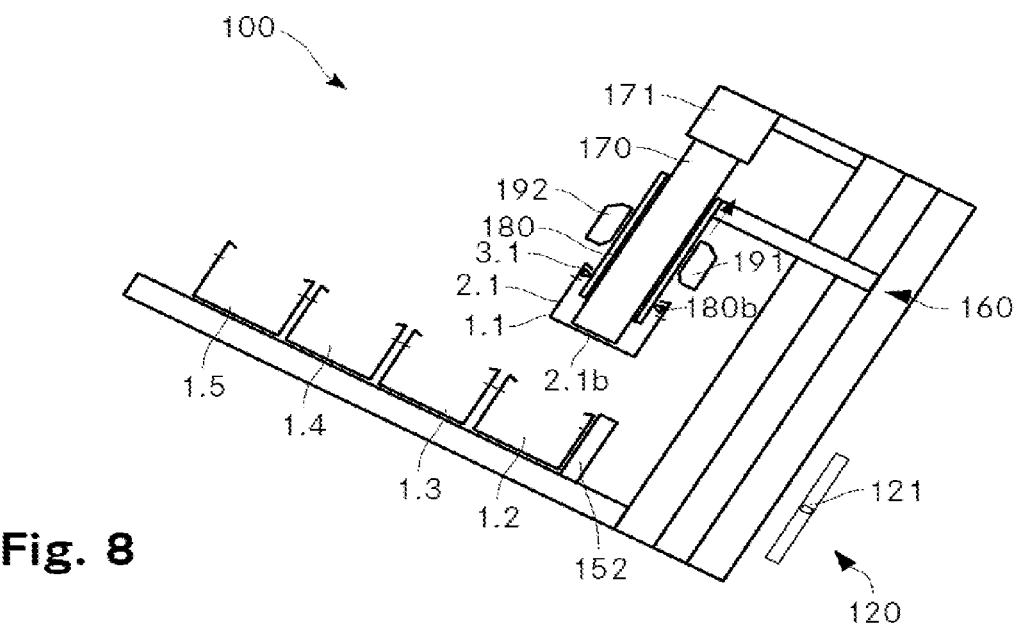

The testing method carried out with the device according to the invention will be explained with reference to the schematic illustrations of FIGS. 6-9. FIG. 6 shows the device 100 in a starting position. The feeder 110 and the bottom plate 151 of the testing unit 150 are provided with closure lids 1.1 . . . 1.4. The latter rest with the base of the lid main body 2.1 . . . 2.4 on the corresponding inclined surfaces, and the opening and the guarantee strip 3.1 . . . 3.4 face upward. The frontmost closure lid 1.1 lies on the stop part 152, and this, together with the side guides (not illustrated here) of the feeder 110 unambiguously determines the position of said closure lid.

The take-along sleeve 180 with the symbolically illustrated bead 180$b$ is located in a partially retracted position in which it does not have any contact with the frontmost closure lid 1.1. The table 121 of the outfeed 120 is in the pivoted-back state (as is also illustrated in FIG. 3).

The take-along sleeve 180 is now moved downward with the aid of the linear guide 160 until its contact region 180$a$ with the bead 180$b$ has penetrated the frontmost closure lid 1.1. The bead 180$b$ in this case temporarily presses the inwardly protruding part of the guarantee strip 3.1 radially outward. Owing to its elasticity, said part snaps back inward again immediately after the passage of the bead 180$b$, such that the bead 180$b$ is positioned behind a corresponding undercut. The situation shown in FIG. 7 arises.

The take-along sleeve 180 is now moved upward with the aid of the linear guide 160. The frontmost closure lid 1.1 is taken along by the bead 180$b$ of the take-along sleeve 180, the bead being held behind the guarantee strip 3.1. As soon as the frontmost closure lid 1.1 has opened up the path, the following closure lid 1.2 slides down as far as the stop part 152 because of gravity. After a corresponding movement of the take-along sleeve 180, the situation shown in FIG. 8 arises, in which the base 2.1$b$ of the lid main body 2.1 makes flat contact with the end side of the mandrel 170. Before forces are transmitted between the mandrel 170 and the closure lid 1.1, a first force measurement takes place with the aid of the force-measuring unit 171. The corresponding value forms a reference value for subsequent measurements by the difference between subsequently measured values and this reference value indicating the tear-off force resulting because of the interaction between mandrel 170 and closure lid 1.1.

The table 121 of the outfeed 120 is now pivoted in under the mandrel 170 by means of the corresponding pneumatic cylinder. The pivoting-in movement can be triggered by the take-along sleeve reaching a predetermined height.

During a further movement of the take-along sleeve 180 upward, an increasing tear-off force arises between the lid main body 2.1, which is supported on the mandrel 170, and the guarantee strip 3.1 held on the bead 180$b$. During this further movement, the tear-off force is measured by the force-measuring unit 171, and the corresponding force values are transmitted to a processing unit. Upon a certain displacement of the take-along sleeve 180 and a corresponding certain tear-off force, the guarantee strip 3.1 tears off from the lid main body 2.1. It then drops onto the pivoted-in table 121 of the outfeed 120 owing to gravity. Owing to gravity, it slides on the table 121 as far as the lower end thereof and then drops through the opening 125 onto the outfeed plate 126 and from there into a receiving container (cf. FIG. 3).

Figure 9:
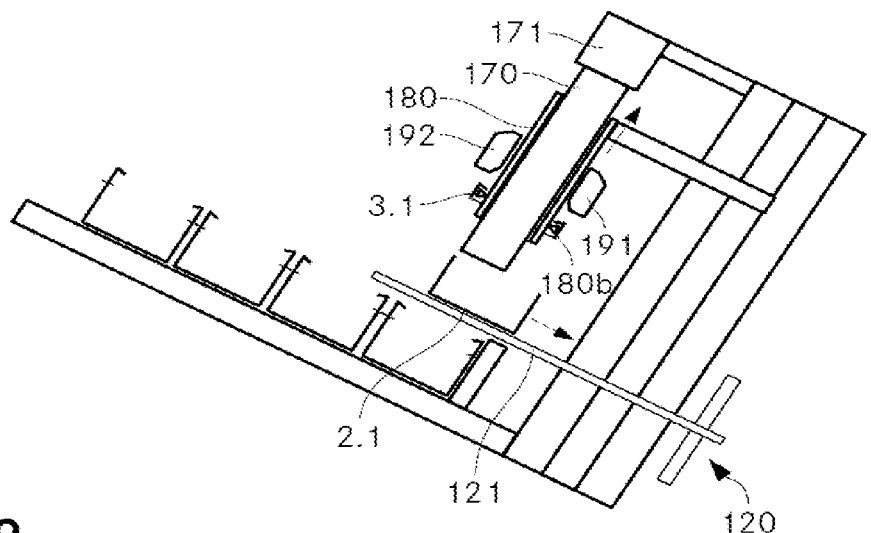

The take-along sleeve 180 is moved further up from the situation illustrated in FIG. 9, the take-along sleeve with the guarantee strip 3.1 held on the bead 180b passing the slitting knives 191, 192. The guarantee strip 3.1 is cut into two parts 3.1c, 3.1d by the two slitting knives 191, 192. Since said parts are no longer held back by the bead 180b, they drop downward, owing to gravity, onto the table 121 of the outfeed 120, cf. FIG. 10. They also slide on the table 121 as far as the lower end thereof and then drop through the opening 125 onto the outfeed plate 126 and from there into the receiving container. The movement of the take-along sleeve 180 is now reversed, i.e. the latter now moves downward again. In addition, the table 121 of the outfeed 120 is pivoted back by means of the pneumatic cylinder. The starting position shown in FIG. 6 arises again.

The speed of the linear movement of the take-along sleeve 180 can be selected differently in the various phases of the described circular process. For example, the following sequence is possible:

| Phase | Start position | End position | Speed |
| --- | --- | --- | --- |
| 1 - Entry | 15 mm | 0 mm | $-v_1$ |
| 2 - Lifting | 0 mm | 75 mm | $v_2$ |
| 3 - Measuring | 75 mm | 80 mm | $v_3$ |
| 4 - Slitting | 80 mm | 120 mm | $v_4$ |
| 5 - Making available | 120 mm | 15 mm | $-v_2$ |

In this case, as a rule $v_3$ (measuring speed)<$v_1$ (entry speed)<$v_4$ (slitting speed)<$v_2$ (rapid motion). The measuring speed is as a rule predetermined by a standard and is, for example, 2 mm/s, and the other speeds can be optimized in respect of high process reliability and rapid running Between the measuring and the slitting, it is optionally possible for a further phase to be run at a higher speed than the slitting speed (for example at rapid motion $v_2$).

The positions are referenced here from the maximally extended position in which the end surface of the mandrel 170 is only at a small distance of a few mm from the surface of the bottom plate 151.

For adaptation to different geometries of the closure lid, elements of the described testing device can simply be exchanged, namely the front part of the mandrel, the sleeve, the slitting knives and optionally the stop part. As mentioned, the width of the channel of the feeder can be adjusted. This is also true of the position of the stop part, and therefore the latter generally does not have to be exchanged.

In order to ensure reliable operation, there are a plurality of sensors present which are not described in more detail here. For example, it is expedient to detect the presence and position of a closure lid on the bottom plate (for example by means of an optical sensor) in order to avoid the testing operation being started if this is not (yet) the case. Similarly, the position of the table of the outfeed is intended to be detected, either by detection of the presence of the table in the space below the mandrel (or the take-along sleeve) and/or by detection of the position of the pneumatic cylinder. This avoids the take-along sleeve, as it is being lowered, colliding with the table which is not (yet) pivoted away.

Figure 10:
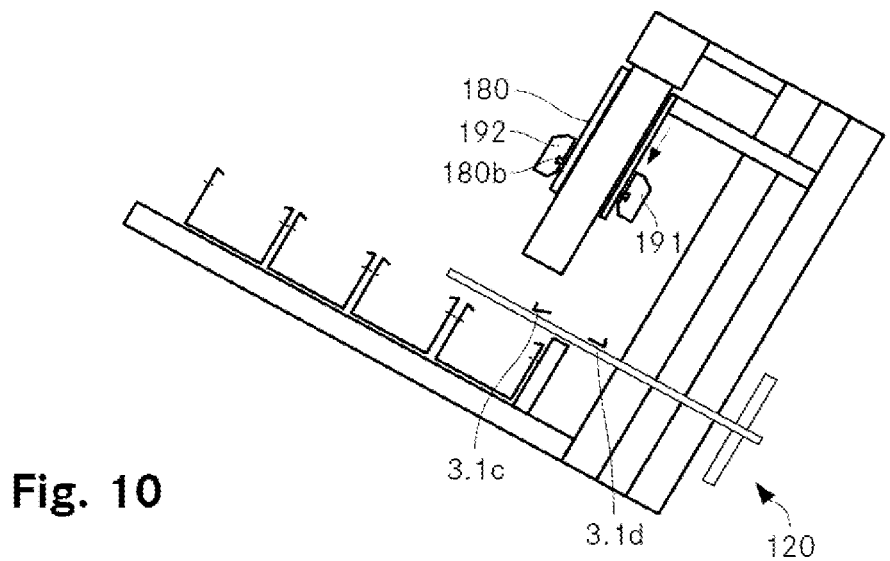
Figure 11:
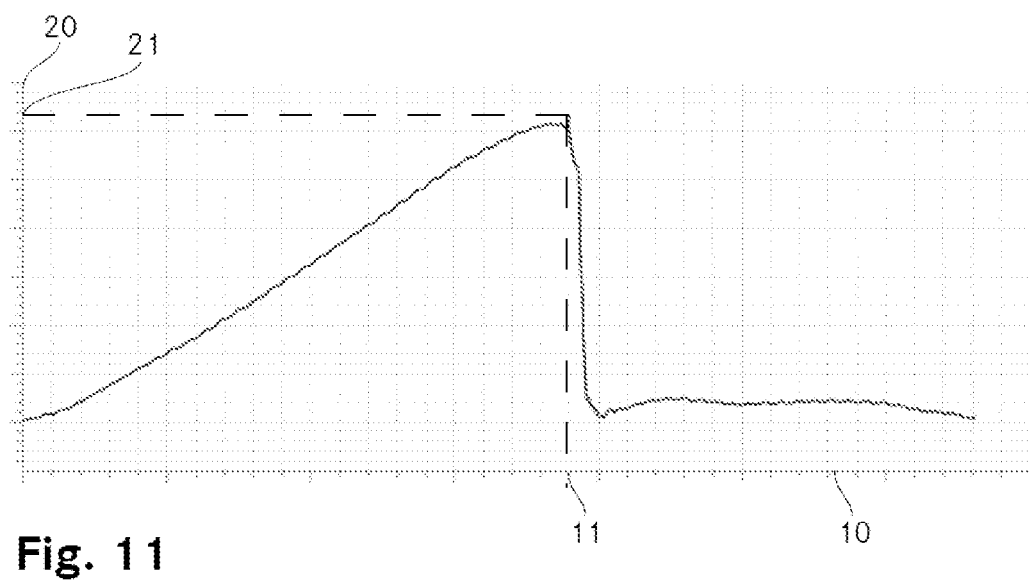
FIG. 11 shows a force-displacement diagram of a testing operation.

FIG. 10 shows a force-displacement diagram of a testing operation. The displacement is plotted along the horizontal axis 10, and the measured tear-off force along the vertical axis 20. It is readily apparent that the tear-off force initially gradually increases after contact of the end side of the mandrel 170 with the base 2b of the lid main body 2. In this phase, in particular the bridges between the main body and the guarantee strip are stretched, which requires a certain application of force. As soon as the guarantee strip tears off, the tear-off force drops abruptly. Relevant variables which can be determined from the profile are the maximally measured force 21 and the corresponding displacement 11. They can be used for assessing the quality of the connection between guarantee strip and main body. If the force profile is considered in more detail, it is also visible when said force profile has, for example, a plurality of local maxima spaced apart in terms of displacement, as a rule in association with a greater displacement value at maximum force. This is an indication of a premature tearing off of a bridge or of some of the bridges. Other characteristics of the profile can indicate a defective clamping of the lid in the testing apparatus, whereupon the result can be rejected and the measurement automatically repeated at the next lid.

Figure 12:
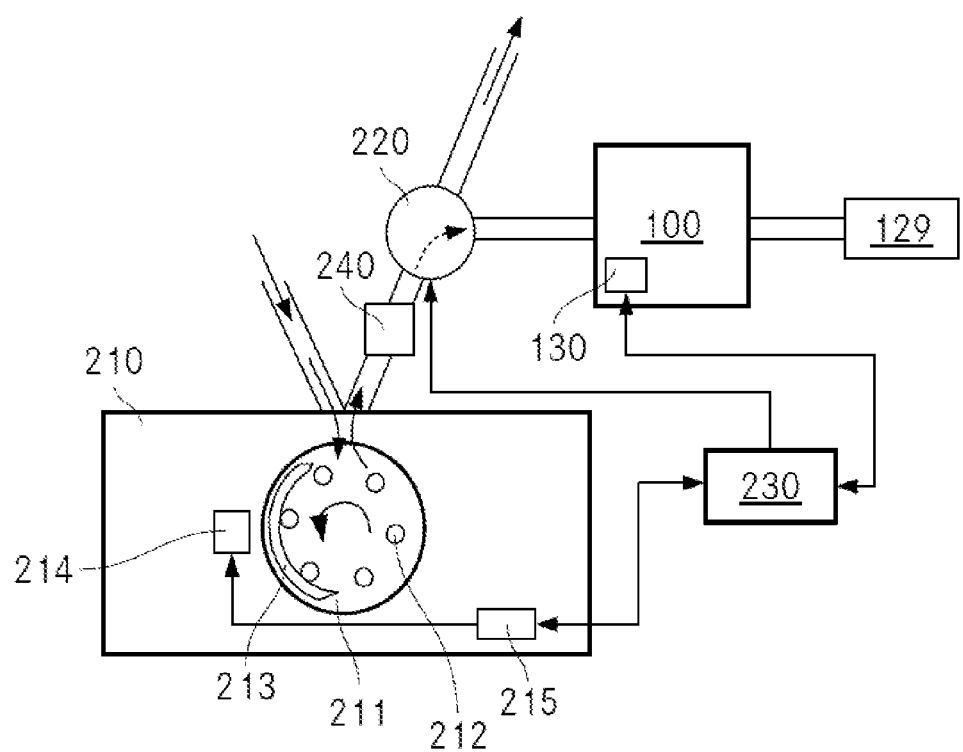
FIG. 12 shows a block diagram of an installation for producing guarantee strips with a testing device according to the invention.

FIG. 12 shows a block diagram of an installation for producing guarantee strips with a testing device according to the invention. The installation comprises a folding/slitting machine 210. In the example illustrated, this comprises a turntable 211 with a plurality of clamping mandrels 212 (6 are indicated here by way of example) for closure lids and a stationary slitting knife 213 which interacts with the clamping mandrels 212 sector by sector and has a cutting edge in the form of a circular arc. The slitting knife 213 is heated by means of a controllable heater 214. The folding/slitting machine 210 also has a controller 215. Corresponding machines are provided, for example, by the applicant PackSys Global Ltd., for example the SPM 35 machine, which, with up to 16 clamping mandrels, reaches a throughput of up to 3,500 plastic caps per minute and both folds and also slits the guarantee strip starting from the injection molding blank (with a selectable sequence).

The folding/slitting machine 210 and the further components of the installation are controlled and monitored by an installation controller 230.

According to the invention, a rejection device 220 is now arranged on the output side of the folding/slitting machine 210, by means of which individual closure lids can be conducted to the testing device 100 while the remaining closure lids are conducted on to the next station. Corresponding rejection devices are basically known. An object to be rejected is selected therein, for example, by means of a blast of compressed air.

A camera 240 for visually detecting the closure lids is arranged between the folding/slitting machine 210 and the rejection device 220. The camera serves for creating images of the individual lids, these images then permit the installation controller 230 to assign the respective closure lid on the basis of impressed or engraved and visually detected identification information to a specific injection mold or cavity.

As described above, the connection between guarantee strip and lid main body is tested in the testing device 100. The lid main bodies and detached sections of the guarantee strip are conveyed after the measurement into a container 129. The results of the measurements undertaken at a closure lid are then transmitted from the evaluation unit 130 of the testing device 100 via an interface to the installation controller 230. If the results indicate that the tear-off force required for detachment is higher than a predetermined value, the heater 214 is instructed to increase the temperature of the slitting knife 213. If the maximum slitting knife temperature has already been reached or the results indicate a malfunction of the folding/slitting machine 210, an error message is passed to an operator. If the malfunction relates to an individual clamping mandrel 212 or to an individual injection molding cavity, the tested closure lid can be assigned to said clamping mandrel or to said injection molding cavity, which simplifies the repair. If the maximum temperature of the slitting knife is reached, a warning can already be output so that the exchange of the slitting knife can be prepared.

The invention is not restricted to the exemplary embodiment illustrated. In particular structural details of the individual components can be configured differently. Owing to the speed of the measuring operation and the reproducibility thereof, the testing unit can advantageously also be used in the manual mode. In this case, in particular the feeder can be simplified.

In summary, it should be emphasized that the invention creates a device for testing a connection of a guarantee strip of a security seal of a closure lid having a lid main body, the device permitting rapid testing.

The invention claimed is:

1. A device for testing a connection of a guarantee strip of a security seal of a closure lid having a lid main body, comprising
   a) a take-along element for gripping the guarantee strip;
   b) a stop element for the lid main body, wherein the take-along element and the stop element are movable relative to each other in such a manner that a tear-off force can be exerted on the guarantee strip and wherein the stop element is formed on the end side of a mandrel;
   c) a force-measuring device for measuring the tear-off force during the relative movement of the guarantee strip and the lid main body;
   d) a cutting device for severing the guarantee strip, wherein
   e) the take-along element surrounds the mandrel in a sleeve-shaped manner and is movable linearly relative to the mandrel along a longitudinal direction of the mandrel; and
   f) the cutting device is adapted to severing the guarantee strip after the latter has been torn off from the lid main body.

2. The device as claimed in claim 1, wherein the cutting device comprises at least one slitting knife which is arranged in the circumferential region of the mandrel and is designed in such a manner that the guarantee strip is severed as it moves over the slitting knife, along the longitudinal direction of the mandrel.

3. The device as claimed in claim 2, wherein the cutting device comprising at least two slitting knives which are arranged in such a manner that the guarantee strip is severed at two circumferentially spaced-apart points.

4. The device as claimed in claim 2, wherein the sleeve-shaped take-along element having at least one groove in the longitudinal direction of the mandrel, said groove interacting with the at least one slitting knife.

5. The device as claimed in claim 1, wherein the longitudinal direction of the mandrel has an angle of at least 30° with respect to a horizontal plane, wherein a movement in the longitudinal direction of the mandrel for measuring the tear-off force takes place upward and wherein the device comprises a collecting apparatus for the lid main body and the torn-off guarantee strip, said collecting apparatus being movable below the mandrel temporarily into a collecting position.

6. The device as claimed in claim 5, wherein the collecting apparatus having a collecting surface which is inclined in the collecting position, and therefore the collected lid main body and the collected guarantee strip are automatically conveyed further owing to gravity.

7. The device as claimed in claim 6, wherein the longitudinal direction of the mandrel has an inclination of 10-80° with respect to the horizontal plane and in that the supporting surface of the collecting apparatus in the collecting position is perpendicular to the longitudinal direction of the mandrel.

8. The device as claimed claim 5, wherein the collecting apparatus is movable into the collecting position by rotation about an axis parallel to the longitudinal direction of the mandrel.

9. The device as claimed in claim 1, further comprising an evaluation unit for receiving measurement values of the measurements of the tear-off force, for determining with reference to said measurement values whether the connection of the guarantee strip to the lid main body meets predetermined properties and for outputting results of this determination.

10. The device as claimed in claim 9, wherein it can be determined by the evaluation unit with reference to a plurality of received measurement values for the same connection whether one of a plurality of bridges of the connection has a considerably reduced or increased tear-off force in comparison to other bridges of the connection.

11. The device as claimed in claim 1, comprising
    d) a feed apparatus for automatically feeding the closure lid to the take-along element and to the stop element; and
    e) an outfeed apparatus for automatically removing the lid main body and the torn-off guarantee strip from the take-along element and/or the stop element.

12. An installation for slitting a guarantee strip for the security seal of a closure lid, comprising
    a slitting apparatus for producing circumferential cuts in order to form the guarantee strip on a lid main body of the closure lid;
    a device as claimed in claim 11, which is arranged downstream of the slitting apparatus, for testing a connection of the guarantee strip to the lid main body, wherein the closure lid is automatically fed by the slitting apparatus to the device for testing.

13. The installation as claimed in claim 12, wherein the evaluation unit is coupled in terms of signals to a control apparatus of the installation such that the results of the determination can be transmitted to the control apparatus.

14. The installation as claimed in claim 13, wherein the control apparatus is designed in such a manner that a processing parameter of the slitting apparatus, in particular a temperature of a slitting knife of the slitting apparatus, can be influenced according to the transmitted results.

15. The installation as claimed in claim 13, wherein a tested closure lid is assigned to a part-tool of the slitting apparatus, which part-tool has interacted with the closure lid during the slitting of the guarantee strip, and/or to a cavity of an injection mold such that malfunctions determined with reference to the measurements of the tear-off force can be assigned to said part-tool and/or to the cavity.

* * * * *